US010671934B1

(12) United States Patent
Ninh et al.

(10) Patent No.: US 10,671,934 B1
(45) Date of Patent: Jun. 2, 2020

(54) REAL-TIME DEPLOYMENT OF MACHINE LEARNING SYSTEMS

(71) Applicant: DOCBOT, Inc., Irvine, CA (US)

(72) Inventors: Andrew Ninh, Fountain Valley, CA (US); Tyler Dao, Fountain Valley, CA (US); Mohammad Fidaali, Chino Hills, CA (US)

(73) Assignee: DOCBOT, Inc., Irvine, CA (US)

( * ) Notice: Subject to any disclaimer, the term of this patent is extended or adjusted under 35 U.S.C. 154(b) by 0 days.

(21) Appl. No.: 16/512,751

(22) Filed: Jul. 16, 2019

(51) Int. Cl.
*G06N 5/04* (2006.01)
*H04N 19/186* (2014.01)
*G06K 9/00* (2006.01)
*H04N 19/115* (2014.01)
*G06N 20/00* (2019.01)
*G06K 9/62* (2006.01)

(52) U.S. Cl.
CPC .......... *G06N 5/04* (2013.01); *G06K 9/00718* (2013.01); *G06K 9/6267* (2013.01); *G06N 20/00* (2019.01); *H04N 19/115* (2014.11); *H04N 19/186* (2014.11)

(58) Field of Classification Search
None
See application file for complete search history.

(56) References Cited

U.S. PATENT DOCUMENTS

| 2005/0036668 | A1 | 2/2005 | McLennan et al. | |
|---|---|---|---|---|
| 2007/0005795 | A1* | 1/2007 | Gonzalez | G11B 27/10 709/232 |
| 2007/0279521 | A1* | 12/2007 | Cohen | G06K 9/00664 348/376 |
| 2012/0320088 | A1* | 12/2012 | Ihara | G05B 23/0216 345/629 |
| 2014/0031677 | A1 | 1/2014 | Iftimia et al. | |
| 2015/0260534 | A1* | 9/2015 | Shen | G01C 21/34 701/408 |

(Continued)

OTHER PUBLICATIONS

T. Holmes "What Is Frame Rate", Feb. 2019, pp. 2 (extracted from https://wistia.com/learn/production/what-is-frame-rate).*

(Continued)

*Primary Examiner* — Li Wu Chang
(74) *Attorney, Agent, or Firm* — Cognition IP, P.C.; Edward Steakley (57) ABSTRACT

Methods, systems, and apparatus, including computer programs encoded on computer storage media, for real-time deployment of machine learning systems. One of the operations is performed by the system receiving video data from a video image capturing device. The received video data is converted into multiple video frames. These video frames are encoded into a particular color space format. The system renders a first display output depicting imagery from the multiple encoded video frames. The system performs an inference on the video frames using a machine learning network to determine the occurrence of one or more objects in the video frames. The system renders a second display output depicting graphical information corresponding to the determined one or more objects from the multiple encoded video frames. The system then generates a composite display output including the imagery of the first display output overlaid with the graphical information of the second display output.

21 Claims, 7 Drawing Sheets

(56) References Cited

U.S. PATENT DOCUMENTS

| | | |
|---|---|---|
| 2015/0282749 A1 | 10/2015 | Zand et al. |
| 2015/0374210 A1 | 12/2015 | Durr et al. |
| 2016/0210411 A1 | 7/2016 | Mentis |
| 2019/0238791 A1* | 8/2019 | Ingle .................. A61B 1/00016 |
| 2019/0289359 A1* | 9/2019 | Sekar ................. H04N 21/4333 |

OTHER PUBLICATIONS

International Search Report and Written Opinion in International Application No. PCT/US2019/041945, dated Oct. 9, 2019.

* cited by examiner

REAL-TIME DEPLOYMENT OF MACHINE LEARNING SYSTEMS

BACKGROUND

Computer vision and machine learning networks are used to classify and identify objects in both digital images and videos. In object classification, a machine learning network is trained using a set of training data for classifying particular types of objects. In object identification, the machine learning network is used to recognize specific instances of one or more object types that may exist in an image. With contemporary technology, evaluating and inferring object types in real-time video data, however, is often graphical processing unit (GPU) and central processing unit (CPU) intensive. Due to the intensive processing nature of real-time object inferencing of video data, in prior art embodiments of systems to infer images from video, a significant lag occurs in receiving, processing and rendering video output depicting imagery of the original video data and graphical indications of detected objects. This processing inefficiency leads to significant frame jitter and display frame rates falling well below 50 frames per second. Certain applications, such as real-time video monitoring of medical procedures, require a high display frame rate output of the monitored procedure along with real-time inferencing and detection of objects in the video data.

SUMMARY

Described herein is an exemplary system for classifying and identifying objects in real-time video data. The system provides a first window and second window displaying output data. The first window displays received video input data at a real-time frame rate of at least 50 frames per second. The second window displays graphical indications and/or textual information corresponding to objects detected in the video input data via an inferencing process using a machine learning network. In one embodiment, the second window displays the graphical indications and/or textual information at a frame rate less than or equal to the frame rate of the first window. The second window overlays the first display window. The rendering of the first window and the inferencing of objects and subsequent display of graphical indications in the second window may be performed in a parallel or multi-threaded process. Parallel processing allows the system to display the received video input data at real-time frame rates of at least 50 frames per second, and also display the graphical indications in the second window at a frame rate that may be lower than or equal to the frame rate of the first window.

In general, one innovative aspect of the subject described in this specification can be embodied in systems, computer readable media, and methods that include operations for receiving video data from a video image capturing device. The received video data is converted into multiple video frames. These video frames are encoded into a particular color space format suitable for processing, as will be appreciated by a person skilled in the art such as those explained below. The system renders a first display output depicting imagery from the multiple encoded video frames. The system performs an inference on the video frames using a machine learning network in order to determine the occurrence of one or more objects in the video frames. The system renders a second display output depicting graphical information corresponding to the determined one or more objects from the multiple encoded video frames. The system then generates a composite display output including the imagery of the first display output overlaid with the graphical information of the second display output.

Further areas of applicability of the present disclosure will become apparent from the detailed description, the claims and the drawings. The detailed description and specific examples are intended for illustration only and are not intended to limit the scope of the disclosure.

BRIEF DESCRIPTION OF THE DRAWINGS

The present disclosure will become better understood from the detailed description and the drawings, wherein.

DETAILED DESCRIPTION

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

Figure 1:
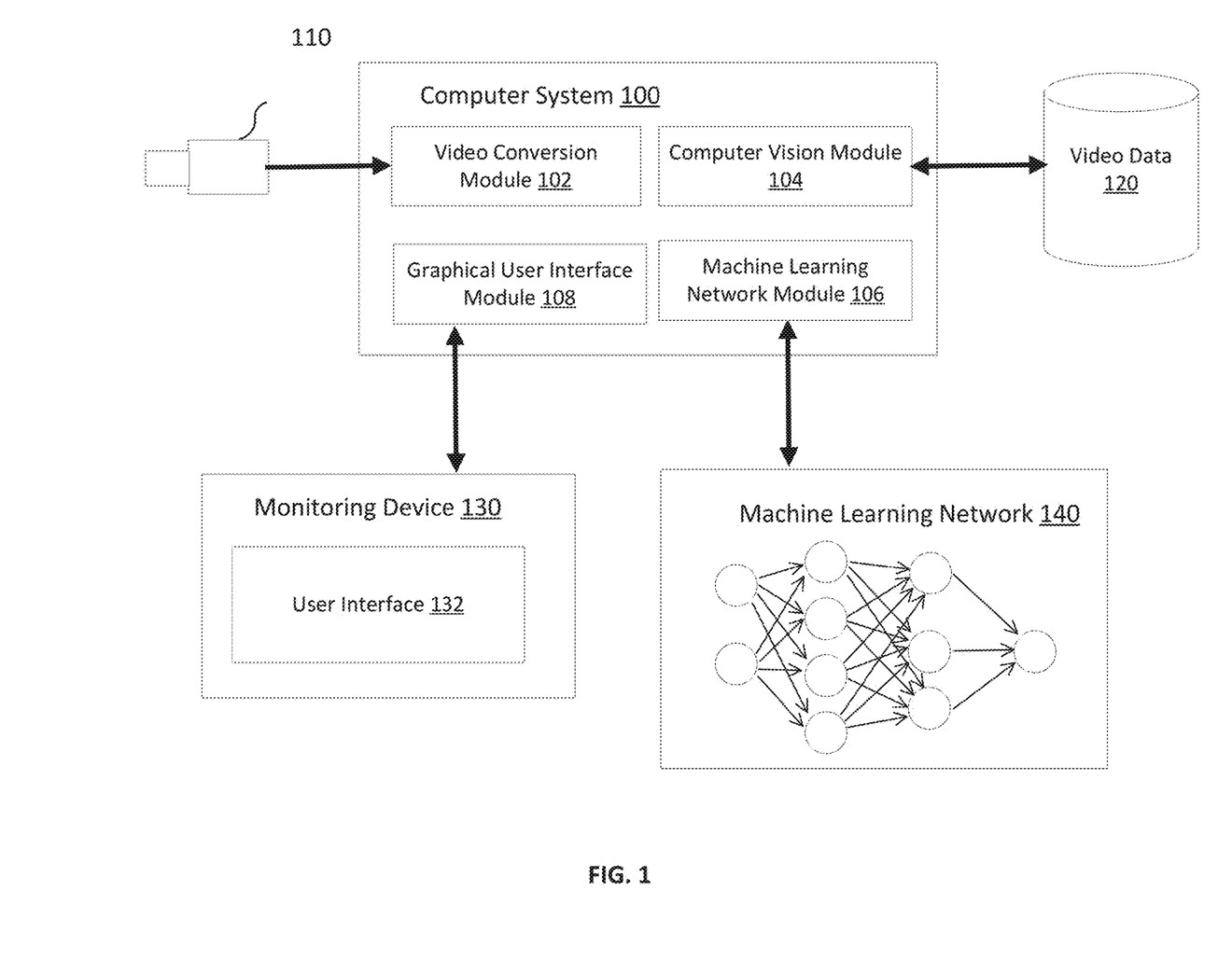
FIG. 1 illustrates a block diagram of an example computer system utilized in real-time deployment of a machine learning network.

FIG. 1 illustrates a block diagram of an example computer system utilized in real-time deployment of a machine learning network. The computer system 100 includes a video conversion module 102, a computer vision module 104, a machine learning network module 106 and a graphical user interface module 108. The video conversion module 102 receives video data from an electronic device 110 capable of obtaining video data (e.g., a digital video camera). The video conversion module 102 converts the received video data into multiple video frames encoded into a particular color space format. The computer vision module 104 processes the multiple video frames and stores the multiple video frames onto a storage device 120. The storage device 120 may be a local or remote database or other type of storage cache. The computer vision module 104 converts the multiple video frames into an input to be processed by the machine learning network module 106. The machine learning network module 106 performs an inference on the multiple video frames and determines the occurrence of one or more object in the video frames. The graphical user interface module 108 renders a composite display output as a user interface 132 that includes a first and second display output. The first display output displays the encoded video frames at or near the frame rate of the encoded video frames. The second display output depicts graphical information corresponding to the determined one or more objects in the video frames. The second display output may depict the graphical information at a frame rate less than or equal to the frame rate of the first display output. The computer system 100 provides the composite display output to a monitoring device (e.g., an external and integral monitor.) The computer system 100 is further described in reference to FIG. 7.

Figure 2:
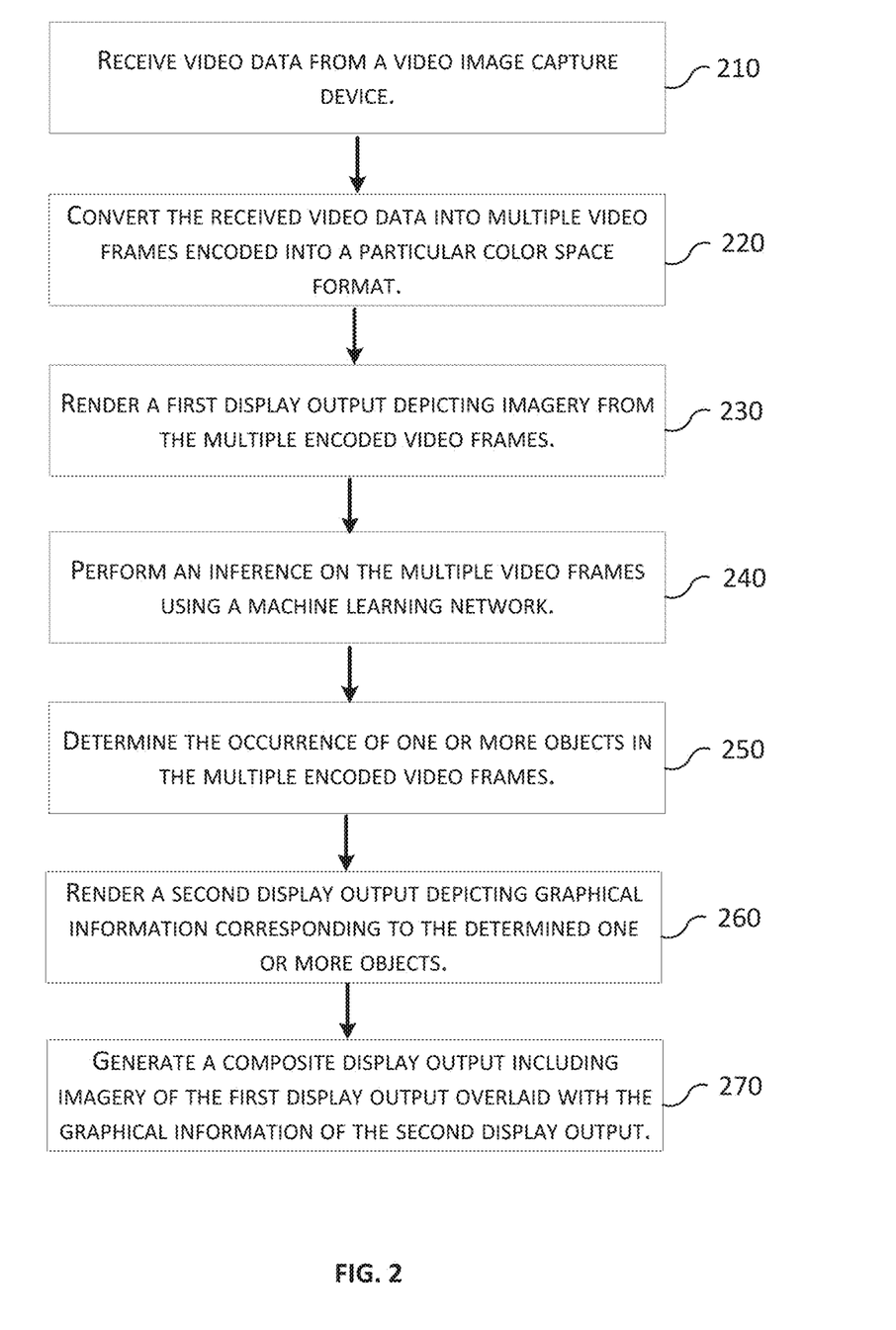
FIG. 2 illustrates an example process for classification and identification of objects in video data.

FIG. 2 illustrates a flowchart of an example process for classifying and identifying objects in video data. The computer system 100 receives video data from a video capture device (block 210). For example, the video capture device obtains real-time digital video using a digital video camera. The video capture device may be an external device connected to the computer system 100 either via a direct wired connection cable or via a wireless connection. Additionally, the digital video camera may be configured as an integral component of the computer system 100. Ideally, the real-time digital video is captured in high definition and has a resolution equal to or greater than 720p (1280×720 pixels).

The computer system 100 converts the received video data into multiple video frames encoded into a particular color space format (block 220). Alternatively, the computer system 100 may receive digital video data that has already been encoded into a particular color space format. If so, the computer system 100 may forgo the conversion of the video data into an encoded color space format. An example suitable frame rate of the encoded video frames is a rate of 50 frames per second or greater.

The computer system 100 renders a first display output depicting real-time imagery from the multiple encoded video frames (block 230). The system 100 may use a first group of one or more dedicated graphical processing units (GPUs) to render the first display output. The first display output displays the encoded video frames at or near the frame rate of the encoded video frames. The computer system 100 may display the video frames via the first display output at a high definition resolution of 1280×720 pixels or greater and at a high frame rate of 50 frames per second or higher.

The computer system 100 performs an inference on the multiple video frames using a machine learning network (block 240) using a second group of one or more dedicated GPUs. The system 100 evaluates the encoded video frames through an inference process using a machine learning network that has been trained to classify one or more objects types in digital images. The machine learning inference process produces an overlay display having bounding polygon (e.g. bounding box) coordinates. The results of the inferencing (i.e., the bounding polygon coordinates) are sent to the memory of the first group of one or more dedicated GPUs which render the results of the second display output. By using two groups of dedicated GPUs, the system 100 may parallel process the rendering of the first and second display outputs using the first group of one or more GPUs, and the inferencing of video frames using the second group of one or more GPUs.

The computer system 100 determines the occurrence of one or more objects in the multiple encoded video frames (block 250). The computer system 100 may use a trained machine learning network to identify the likelihood that a particular object of a certain class exists in a video frame. The machine learning network may assign a confidence level (e.g., a probability) that an object of a particular class occurs in a video frame. The computer system 100 generates a graphical indication around or about an identified object in the video frame indicating the location of the identified object. For example, the computer system 100 may generate a graphical identifier, such as bounding perimeter (e.g., coordinates for an outlined rectangle), around or about an identified object. The computer system 100 may use other graphical indicators, such as a colored pixel group area, a change in the color or contrast of a pixel group area, or other graphical identifier indicating the occurrence of an identified object.

The computer system 100 renders a second display output depicting graphical information corresponding to the determined one or more objects (block 260) in the video frames. The graphical information may include one or more of: the graphical indications, textual information identifying the type of object and/or textual information indicating the confidence that the object is of a certain type (e.g., a percentage or confidence score).

The output values (e.g. graphical information) of object inferencing are stored in specific locations in memory of the first group of one or more GPUs. As such, for the second display output, the computer system 100 may obtain information from the specific memory locations for every video frame. The system 100 then can overlay the graphical information for the second display output at the same frame rate as the first display output. In other words, the computer system 100 may render two windows at the same frame rate. The first window displays the real-time imagery obtained by the video capture device. The second window overlays the first window and displays the graphical information for the object inferencing.

The computer system 100 then generates a composite display output including imagery of the first display output overlaid with the graphical information of the second display output (block 270). As indicated above, the first display output is rendered at or near the frame rate of the encoded video frames. The second display output includes the graphical information generated during the inferencing process using the trained machine learning network. The first display output is overlaid with the second display output. Overlaying the first display output with the second display output allows the computer system 100 to display real-time video with a high frame rate along with graphical indications of objects identified in the video by the machine learning network. The computer system 100 may provide the composite display output to an external monitoring device or a monitoring device integral to the computer system 100. Moreover, the computer system 100 may stream the composite display output via a streaming media server to remote monitoring devices. For example, a user of a remote monitoring device may be able to view the procedure in real time via the Internet or other secured virtual private network.

Figure 3:
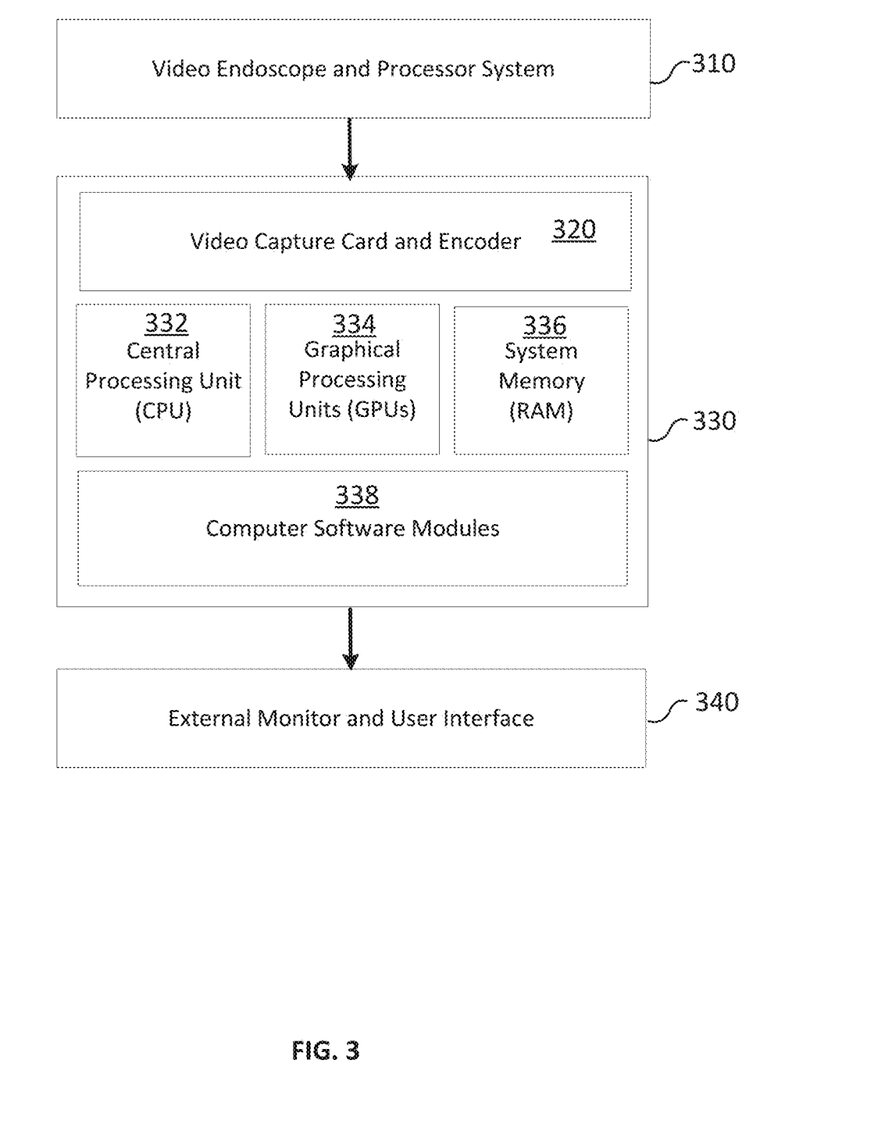
FIG. 3 illustrates a high-level block diagram of an example computer system utilized in real-time deployment of a machine learning network.

FIG. 3 illustrates an exemplary system utilized in real-time deployment of a machine learning network. A video endoscope and processor system 310 provides video to the computer system 330. The computer system 330 includes a video capture card and encoder 320 to encode video received from the endoscope and processor system 310. The computer system 330 includes a central processing unit (CPU) 332, two or more graphical processing units (GPUs) 334 and system memory 336. The computer system 330 executes various computer software modules 338, including: a module to receive video data from the endoscope and processor system; a module to convert the received video data into multiple video frames encoded into a particular color space format; a module to process the multiple video frames and store the multiple video frames onto a storage device; a module to convert the multiple video frames into an input to be processed by a machine learning network; a module to perform an inference on the multiple video frames and determine the occurrence of one or more objects in the video frames; and a module to renders a composite display output as a user interface that includes a first and second display output. The first display output displays real-time video obtained by the system 330. The second display output displays graphical indications and information about objects in the video identified by a machine learning network. The user interface generated by the system may be provided to an external monitoring device 340.

The endoscope 310 unit includes a processor and other electronic circuitry to receive video imagery from an endoscope. The endoscope unit 310 may include one or more video outputs (e.g., ports or connectors): composite video, video graphics array (VGA), Bayonet Neill-Concelman (BNC), digital video interface (DVI), DVI-D (single or dual link), serial digital interface (SDI), HD-SDI, Dual Link HD-SDI, 3G-SDI, 6G-SDI, 12G-SDI, high definition multimedia interface (HDMI), mini HDMI, micro HDMI, DisplayPort, digital interface for video and audio (DiiVA), HDBaseT, CoaxPress, and/or mobile high-definition link (MHL). In one embodiment, the video output of the endoscope unit is directly connected via wired cable to an input to the video capture card 320.

The system 330 may use a video capture card 320 and encode the obtained video data into encoded video frames. An example suitable capture card allows receipt of a video input signal and conversion of the video input signal into encoded video frames of a particular color space format.

Figure 4:
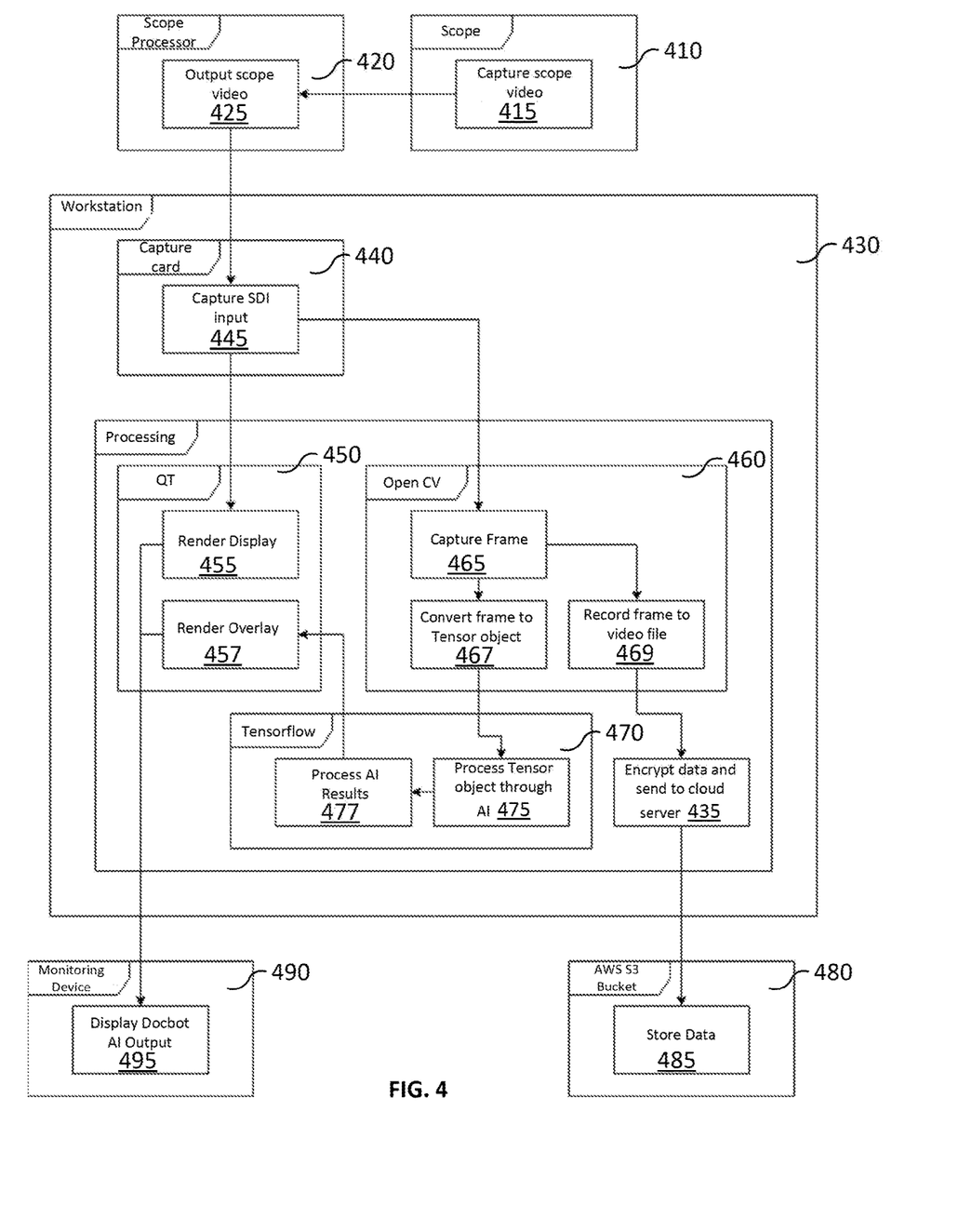
FIG. 4 illustrates a low-level block diagram of an example computer system utilized in real-time deployment of a machine learning network.

FIG. 4 illustrates a process flow for classifying and identifying objects in video data in the context of an endoscopy procedure using the computer system described in FIG. 3. Endoscopy is a procedure used to evaluate or view inside a patient's body. For example, endoscopy may be used to diagnose diseases of the colon, stomach, esophagus, ear, nose, throat, heart, urinary tract, joints and abdomen. During an endoscopy procedure a physician inserts an endoscope into the patient's body to obtain video imagery of the patient's body.

An endoscope 410 obtains video imagery (block 415) using a digital camera attached to the endoscope 410. An endoscope 410 typically includes a lighting source and a digital video camera attached near a probing end of the endoscope 410. The endoscope 410 is connected to a main endoscope unit 420 that controls the operation of the endoscope 410 and processes video imagery obtained by the endoscope 410 camera. The endoscope unit 420 outputs video imagery (block 425) to one or more video displays so that the examining physician may view the inside of the patient's body during the endoscopy procedure. Another example of an endoscope 410 is a fiber-optic endoscope (also referred to as a fiber-scope) including a bundle of flexible-fiber optic cables coupled to the endoscope unit 420. Some of the fiber-optic cables are used to transmit a light source from the endoscope unit 420 to an examining end of the fiber-optic cables to illuminate a patient's body cavity. Other fiber-optic cables include lenses at the examining end of the fiber-optic cables to capture imagery of the patient's body cavity. The imagery is sent back via the fiber-optic cables to a receiving video camera to record the operation.

A video output signal of the endoscope unit 420 is received by a video capture card 440 of the computer system 430. For example, the video capture card 440 receives (e.g., captures) a video output signal (block 445) from the endoscope unit 420 by way of an SDI connector. The video capture card 440 converts the received video output signal into multiple encoded video frames. In various embodiments, the received output signal may be encoded into various color space formats such as NV12, I420, YV12, YUY2, YUYV, UYVY, UVYU, V308, IYU2, V408, RGB24, RGB32, V410, Y410 or Y42T.

The multiple encoded video frames are stored into a memory cache of the video capture card 440. In one embodiment, the multiple encoded video frames may be generated to correspond to a frame rate of 60 frames per second. However, the computer system 430 may be configured to generate a video frame rate of between 50 to 240 frames per second and/or generate a variable frame rate.

The computer system 430 executes a computer vision module 460 for the identification and extraction of objects in the video frames. In one embodiment, the computer vision module 460 is implemented using a first group of one or more CPUs. In various embodiments, the computer vision module 460 may be implemented using the first or second group of GPUs, or a third group of one or more GPUs, or a combination thereof. In one embodiment, OpenCV is used to perform these functions. OpenCV is an opensource real-time computer vision and machine learning software library. Using an application programming interface, the computer vision module 460 obtains (e.g. captures) the stored video frame data (block 465) directly from the memory cache of the video capture card 440. The computer vision module 460 may retrieve the stored video frame data (block 465) through an Application Programming Interface (API) call to the video capture card 440 to directly transfer the data to the computer vision module 460 without transferring the data to RAM. The computer vision module 460 may retrieve one or more video frames from the video capture card per retrieval call.

In one embodiment of an API call, the API is implemented by the video capture card 440. The first group of one or more CPUs implementing the computer vision module 460 performs a call to an API function implemented by the video capture card 440. The API function call may include a source address identifying the memory location in the video capture card 440 of the data to transfer, such as the stored video frame data (block 465), and an address indicating the location in the memory of the GPU to transfer the data. In response to the API call, the video capture card 440 transfers the data from the source location to the destination location through an interconnect, such as a bus, a crossbar, network interconnect, or PCI Express. The CPU of computer system 430 is not involved in the transfer process.

The computer vision module 460 may process the obtained video frame data and generate a video file. This process allows the computer system 430 to store video imagery of the endoscopy procedure. For example, the computer vision module 460 may use an OpenCV function VideoWriter (const String& filename, int fourcc, double fps, Size frameSize, bool isColor=true), where the variable filename is the name of the output video file, fourcc is a 4-character code used to compress the frames, fps is the framerate of the created video stream, frameSize is the size of the video frames, isColor is used to identify color or grayscale frames.

The computer system 430 may begin recording and storing video imagery received from the endoscope unit based on one or more events. In one example, the computer system 430 begins or stops recording video when the computer system 430 receives a specific command (such as a received user input to the computer system 430 to begin or stop recording.) In another example, the computer system 430 may begin storing the received video imagery when the computer system 430 determines that the endoscope unit begins transmitting video data to the computer system 430.

Additionally, the computer system 430 may begin recording video imagery received from the endoscope unit when the computer system 430 detects the start of an evaluation procedure. The computer system 430 may compare a first video frame to a second video frame and detect one or more changes in image characteristics, such as changes in contrast, hue, color, brightness or luminance. For example, as an endoscope is introduced to a patient's body cavity the digital images in the video frames may change from a bright image to a darker image. The computer system 430 may detect the change in brightness as a begin procedure event and start recording the obtained video. Moreover, the computer system 430 may detect the start of the evaluation procedure using a machine learning network to evaluate the video imagery and determine when the start of a procedure has likely begun. Conversely, the computer system 430 may automatically stop recording when the computer system 430 detects that the endoscope is removed from the body cavity. Moreover, the computer system 430 may store a rolling period of video (e.g., a 30 second window), and include the rolling period video in the recorded video imagery.

Concurrently, or after the endoscopy procedure is completed, the video file may be encrypted (block 435) by the computer system 430 and transmitted over a secure network to a cloud-based server (e.g., Amazon Simple Storage Service) 480 and stored (block 485) for later retrieval or analysis.

After obtaining the frame data (block 465), the computer vision module 460 converts the video frame data to a tensor object (block 467) for processing through a machine learning network. A tensor object comprises a vector or matrix of any number of dimensions. A tensor object may have dimension 0 (scalar), dimension 1 (vector), dimension 2 (2-dimensional matrix), or higher numbers of dimensions. For example, the computer system 430 may process a video frame and convert the frame (e.g. an input image) into a tensor object. The frame is converted into a tensor by first creating a new tensor object, and then mapping every pixel from that frame into the tensor.

In one embodiment, the computer system 430 uses a TensorFlow module 470 and its Object Detection API framework to perform an inference on the tensor object. TensorFlow is an opensource library for machine learning and numerical computation. In TensorFlow, computations involve tensors which are vectors or matrices of multi-dimensional arrays that represent various types of data. In TensorFlow, computation is approached as stateful dataflow graphs. The TensorFlow Object Detection API is an open source framework built on top of TensorFlow allowing the construction, training and deployment of object detection models.

The computer system 430 uses one or more pre-trained machine learning networks and performs an inference process on the tensor objects (block 475). The machine learning networks may be trained to infer various object types or classes based on image features from a set image training data. In one embodiment, the machine learning networks are trained to identify polyps based on a training set of digital images data including various images of polyps. The machine learning networks learn the features of the polyps and are able to identify the occurrence of a polyp in a digital image. Machine learning networks may be trained for different tasks such as identifying the location in the body of the endoscope, identifying whether a polyp is present, identifying the type of polyp, and so on. One or more of the machine learning networks may be run in parallel to increase processing bandwidth and complete inference more quickly.

The TensorFlow module 470 produces results (block 477) indicating the likelihood that an input image is of a particular type of object. The TensorFlow module 470 outputs coordinate values associated with the detected object. For example, if a polyp is detected, a graphical indication such as a bounding polygon (e.g. a bounding box) with Cartesian coordinates describing a rectangle or square will be generated. The coordinate values will be outputted from Tensorflow module 470, and sent to Qt Framework 450 to graphically render the bounding polygon as an overlay.

The computer system 430 executes a graphical user interface module 450 to generate a composite video output as a user interface. The composite video output may be displayed to an external monitoring device 490. In one embodiment, the computer system 430 executes Qt software to manage and generate the composite video output. Qt software is an open-source toolkit for developing graphical user interfaces. The computer system 430 uses the Qt framework 450 to display two windows. The Qt framework 450 may be run on the first group of one or more CPUs, or a second group of or one or more CPUs that is different than the first group of CPUs running the computer vision module 460. Moreover, the Qt framework may be run on the first group of GPUs, the second group of GPUs, or a third group of one or more GPUs, or a combination thereof. Using an API, the Qt framework 450 obtains stored video frame data directly from the memory cache of the video capture card 440. The transfer may be performed without involving a CPU of computer system 430 and without the video frame data being stored in RAM of computer system 430. The Qt framework 450 may retrieve one or more video frames from the video capture card per retrieval call. The computer system 430 renders one window (i.e., a first display window) to display the multiple encoded video frames (block 455) of the received video. The computer system 430 uses another window (i.e. a second display window) to render an overlay window (block 457). The overlay window displays the multiple encoded video frames with graphical results generated from the processing of video frames via the machine learning network model.

In one embodiment of an API call, the API is implemented by the video capture card 440. The Qt framework 450 performs a call to an API function implemented by the video capture card 440. The API function call may include a source address identifying the memory location in the video capture card 440 of the data to transfer, such as one or more video frames, and an address indicating the location in the memory of the GPU to transfer the data. In response to the API call, the video capture card 440 transfers the data from the source location to the destination location through an interconnect, such as a bus, a crossbar, network interconnect, or PCI Express.

In one embodiment, the first display window presents the multiple encoded video frames in real-time as they are received from the video capture card 440. The second display window presents a graphical overlay indicating identified objects and other textual and graphical information in the second display window. For example, the first display window may present real-time imagery of an endoscopy procedure, such as a colonoscopy depicting imagery of a patient's colon. The first display window presents the video obtained by the endoscope 410. Additionally, the first display window may present other user interface information displayed by the endoscope unit 410 in the video. The second display window presents graphical and/or textual information laid over, in front of, or on top of the first display window. The first display window may be displayed at resolutions of 1080p (1920×1080 pixels), 2K (2048×1080 pixels), 1440p (2560×1440 pixels), 4K or 2160p (3840× 2160 pixels) and/or 8K (7680×4320 pixels).

Figure 5:
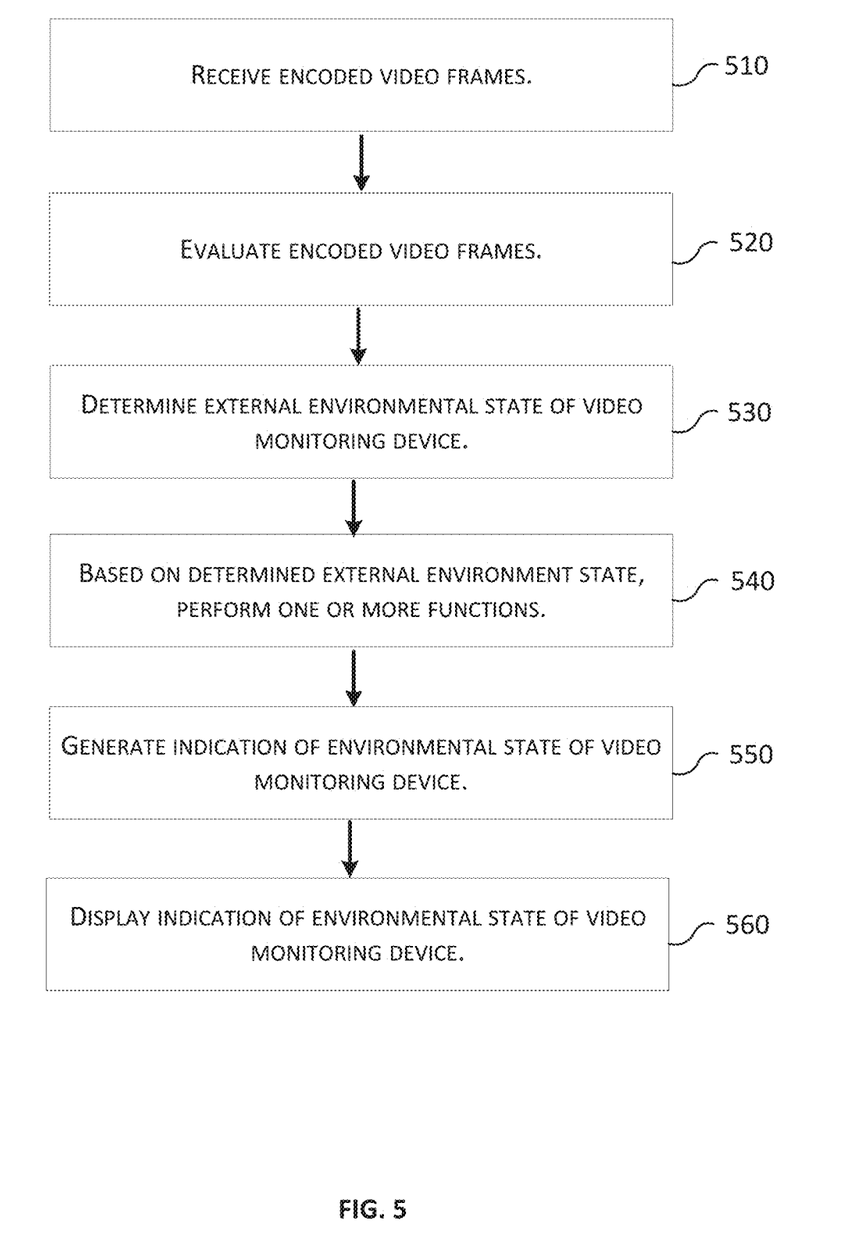
FIG. 5 illustrates a flowchart of an example process for evaluating video data to determine an external environmental state of a video monitoring device.

FIG. 5 illustrates a flowchart of an example process for evaluating video data to determine an external environmental state of a video monitoring device. The computer system 100, 330, 430 may perform additional functions or processes based on evaluation of video frames. The computer system 100, 330, 430 receives the encoded video frames (block 510). For example, as an endoscope is inserted into a patient's body cavity, the computer system 100, 330, 430 receives live video imagery from the endoscope unit and the computer system 100, 330, 430 converts the video data into encoded video frames.

The computer system then evaluates the images of the encoded video frames (block 520). The computer system 100, 330, 430 may compare a first image to a subsequent second image, and/or compare the image characteristics of a particular video frame against a pre-determined set of required image characteristics. By evaluating the video frames, the computer system may determine an external environmental state of the video monitoring device (block 530). For example, in the context of a colonoscopy, the external environmental state of the endoscope may be evaluated by the computer system 100, 330, 430 to assess whether the colon is empty and clean enough to examine the colon for polyps and/or other abnormalities. The computer system 100, 300, 430 may evaluate via a machine learning network image characteristics (e.g., hue, color, brightness, contrast, luminance) of the video frames. In one embodiment, the computer system 100, 330, 430 may evaluate the color of the colon to determine if the colon is prepared for the colonoscopy. In another embodiment, a machine learning network may be trained on numerous digital images of colon preparation. The machine learning network may determine whether a colon is prepared by evaluating one or more video frames and determine a result, such as "1" for a good result, or "0" for a bad result. Based on the machine learning network, the system 100, 330, 430 may determine on a binary scale the quality of the colon preparation with 0 being the worst and 1 being the clearest. If the colon preparation is not of a sufficient quality, the system 100, 330, 430 may indicate via the second display output textual and/or graphical indications that the colon is not sufficiently prepared for the procedure.

Based on the determined external environmental state, the computer system 100, 330, 430 may perform one or more functions (block 540). For example, the computer system may forgo other inferencing of video images via the machine learning network if the computer system determines the environmental state is unsuitable (e.g., not prepared or clean enough) to identify objects in the video images. However, the computer system may perform other inferencing via the machine learning network if the external environmental state is determined to be suitable. For example, the computer system 100, 330, 430 may generate an indication or score of how well the colon is prepared. If the preparation score exceeds a pre-determined threshold value, then the computer system may determine that the colon (i.e., the external environment) is suitable for other inferencing via the machine learning network. Additionally, the computer system 100, 330, 430 may generate a message or other user output indicating that the external environmental state is or is not suitable to perform a procedure (e.g., a colonoscopy).

The computer system 100, 330, 430 may generate an indication of the external environmental state of the video monitoring device (block 550). The computer system 100, 330, 430 may display an indication of the environmental state of the video monitoring device (block 560). For example, the computer system 100, 330, 430 may provide an output indicating the external environmental state to the monitoring device.

Figure 6:
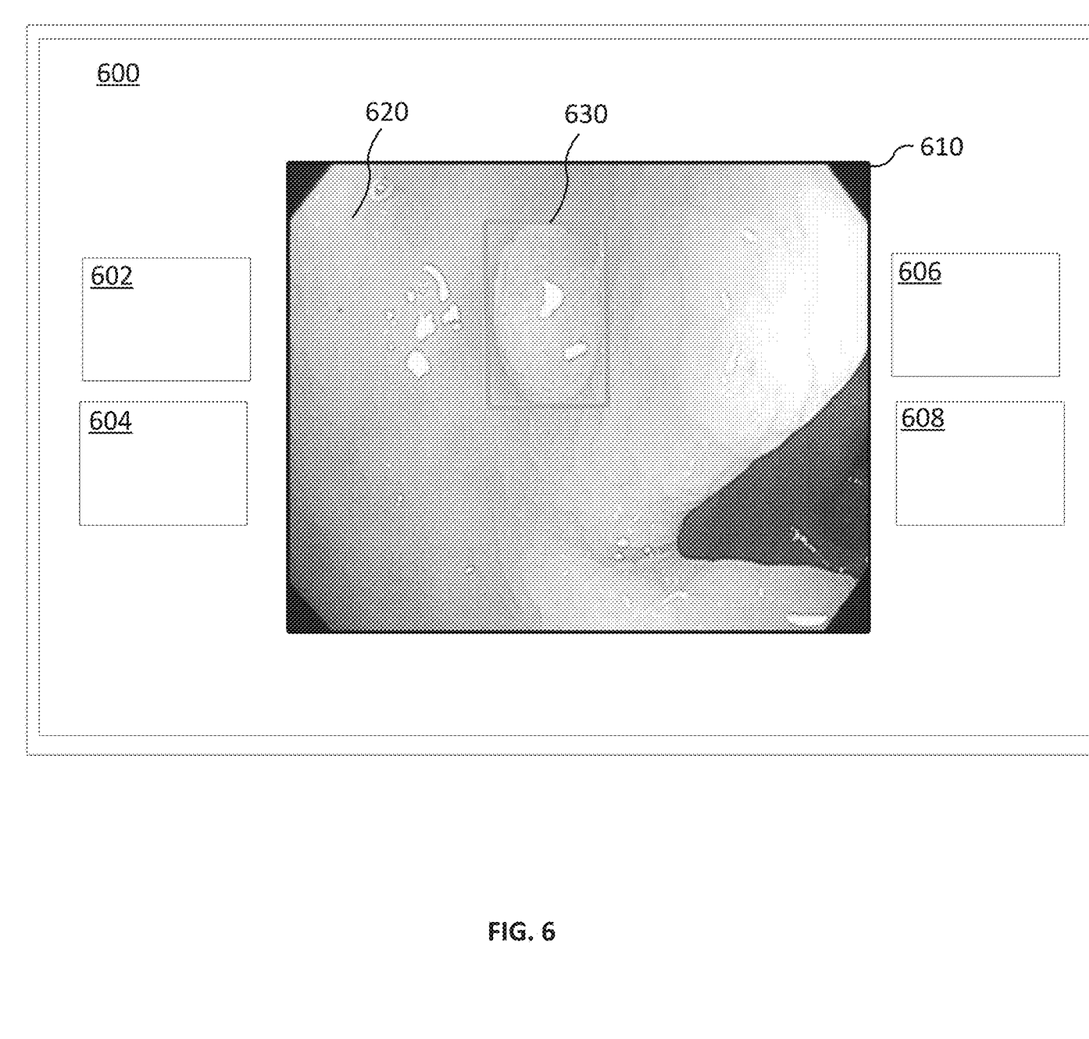
FIG. 6 illustrates an example user interface of the computer system.

Now referring to FIG. 6, an exemplary user interface 600 of computer system 100, 330, 430 is illustrated. The user interface 600 illustrates a composite display of the first display window and the second display window. The user interface 600 includes a video display area 610 to display video from the first display window. The video display 610 area may be part of a sub-area of the user interface 600 or may include the entire display area of the user interface 600. In the example, the video display area 610 is a sub-area of the user interface 600. The video display area displays the video 620 of the first display window as described above.

The user interface 600 includes a graphical information display area for displaying graphical information of the second display window. A portion of the graphical information display area is displayed over the video display area 610. In the example user interface 600, a graphical indication (e.g., a rectangular bounding polygon) of a detected object 630 is displayed over the video 620 in the video display area 610.

The graphical information display area may also include other sub-areas of the user interface. The graphical information display area may include informational display areas 602, 604, 606, 608 that displays information corresponding to objects 630 identified in the video frames 620. For example, the informational display area 602 may display information about the type or class of detected object 630. Informational display area 602 may indicate that the detected object 630 is a polyp.

Additionally, where multiple objects are detected and displayed in the video display area 610, the informational display areas 602, 604, 606, 608 may be labeled with an identifier, such as alphanumeric characters, that correspond with labels on the graphical indications of the detected objects. For example, the computer system 100, 330, 430 may have detected four objects in the video frames using the machine learning network as discussed above. In this case, the graphical information display area would include four graphical indications of objects (e.g., four rectangular bounding polygons). Each of the four graphical indications may be labeled 1, 2, 3, 4 and/or may be color coded. Each of the informational display areas 602, 604, 606, 608 would include information corresponding to a respective detected object. Moreover, different object types may have been detected via the machine learning network. In this case, the graphical indications of the same type of object may be displayed with the same color, and other object types may be displayed in a different color.

Figure 7:
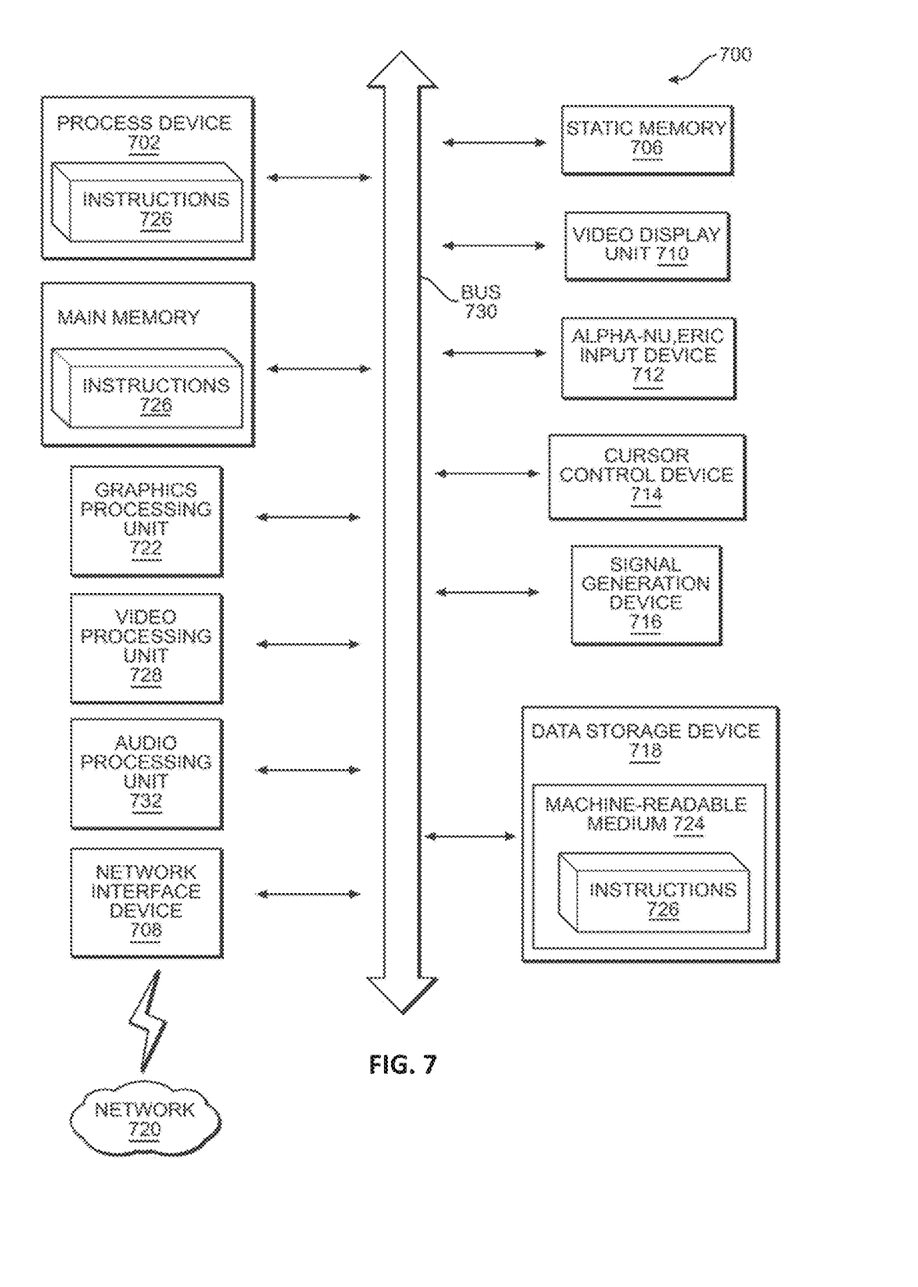
FIG. 7 illustrates an example machine of the computer system.

FIG. 7 illustrates an example machine of a computer system within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage device 718, which communicate with each other via a bus 730.

Processing device 702 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 is configured to execute instructions 726 for performing the operations and steps discussed herein. In one embodiment, the computer system 700 may use a motherboard with PLX chip to optimize use of PCIe lanes of the motherboard.

The computer system 700 may further include a network interface device 708 to communicate over the network 720. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), a graphics processing unit 722, a signal generation device 716 (e.g., a speaker), video processing unit 728, and audio processing unit 732.

The data storage device 718 may include a machine-readable storage medium 724 (also known as a computer-readable medium) on which is stored one or more sets of instructions or software 726 embodying any one or more of the methodologies or functions described herein. The instructions 726 may also reside, completely or at least partially, within the main memory 704 and/or within the processing device 702 during execution thereof by the computer system 700, the main memory 704 and the processing device 702 also constituting machine-readable storage media.

In one implementation, the instructions 726 include instructions to implement functionality corresponding to the components of a device to perform the disclosure herein. While the machine-readable storage medium 724 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

In general, the terms "engine" and "module", as used herein, refer to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on one or more computer readable media, such as compact discs, digital video discs, flash drives, or any other tangible media. Such software code may be stored, partially or fully, on a memory device of the executing computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A system comprising one or more processors, and a non-transitory computer-readable medium including one or more sequences of instructions that, when executed by the one or more processors, cause the system to perform operations comprising:
    receiving video data, the video data having been obtained from a video image capture device;
    converting the received video data into multiple video frames encoded into a particular color space format;
    rendering a first display output depicting imagery from the multiple encoded video frames;
    performing an inference on the multiple video frames using a machine learning network;
    determining the occurrence of one or more objects in the multiple encoded video frames based on the performed inference on the multiple video frames;
    in response to determining the occurrence of one or more objects, generating for a determined object, coordinates describing a bounding perimeter about the determined object;
    rendering a second display output depicting graphical information in a form corresponding to the coordinates of the bounding perimeter for the determined one or more objects from the multiple encoded video frames; and
    generating a composite display output, wherein the composite display output includes the imagery of the first display output overlaid with the graphical information of the second display output.

2. The system of claim 1, wherein the first display output depicts imagery at a frame rate of 50 to 240 frames per second.

3. The system of claim 2, wherein the second display output depicts the graphical information at a frame rate less than or equal to the frame rate of the first display output.

4. The system of claim 1, further comprising the operations of:
    generating a graphical indication around or about the one or more objects indicating the location of the identified objects in the video frame.

5. The system of claim 1, further comprising the operations of:
    determining an external environmental state of the video image capture device; and
    performing the inference if the external environmental state is suitable to perform inferencing via the machine learning network.

6. The system of claim 1, wherein the multiple encoded video frames are encoded in a color space format selected from the group consisting of NV12, I420, YV12, YUY2, YUYV, UYVY, UVYU, V308, IYU2, V408, RGB24, RGB32, V410, Y410 and Y42T.

7. The system of claim 1, wherein the graphical information of the second display output includes graphical indications of the one or more objects disposed over a video display area of the first display output, and textual information corresponding to the one or more objects disposed over a non-video display area of the first display output.

8. A method implemented by a system comprising of one or more processors, the method comprising:
    receiving video data, the video data having been obtained from a video image capture device;
    converting the received video data into multiple video frames encoded into a particular color space format;
    rendering a first display output depicting imagery from the multiple encoded video frames;
    performing an inference on the multiple video frames using a machine learning network;

determining the occurrence of one or more objects in the multiple encoded video frames based on the performed inference on the multiple video frames;

in response to determining the occurrence of one or more objects, generating for a determined object, coordinates describing a bounding perimeter about the determined object;

rendering a second display output depicting graphical information in a form corresponding to the coordinates of the bounding perimeter for the determined one or more objects from the multiple encoded video frames; and generating a composite display output, wherein the composite display output includes the imagery of the first display output overlaid with the graphical information of the second display output.

9. The method of claim 8, wherein the first display output depicts imagery at a frame rate of 50 to 240 frames per second.

10. The method of claim 9, wherein the second display output depicts the graphical information at a frame rate less than or equal to the frame rate of the first display output.

11. The method of claim 8, further comprising the operations of:

generating a graphical indication around or about the one or more objects indicating the location of the identified objects in the video frame.

12. The method of claim 8, further comprising the operations of:

determining an external environmental state of the video image capture device; and performing the inference if the external environmental state is suitable to perform inferencing via the machine learning network.

13. The method of claim 8, wherein the multiple encoded video frames are encoded in a color space format selected from the group consisting of NV12, I420, YV12, YUY2, YUYV, UYVY, UVYU, V308, IYU2, V408, RGB24, RGB32, V410, Y410 and Y42T.

14. The method of claim 8, wherein the graphical information of the second display output includes graphical indications of the one or more objects disposed over a video display area of the first display output, and textual information corresponding to the one or more objects disposed over a non-video display area of the first display output.

15. A non-transitory computer storage medium comprising instructions that when executed by a system comprising one or more processors, cause the one or more processors to perform operations comprising:

receiving video data, the video data having been obtained from a video image capture device;

converting the received video data into multiple video frames encoded into a particular color space format;

rendering a first display output depicting imagery from the multiple encoded video frames;

performing an inference on the multiple video frames using a machine learning network;

determining the occurrence of one or more objects in the multiple encoded video frames based on the performed inference on the multiple video frames;

in response to determining the occurrence of one or more objects, generating for a determined object, coordinates describing a bounding perimeter about the determined object;

rendering a second display output depicting graphical information in a form corresponding to the coordinates of the bounding perimeter for the determined one or more objects from the multiple encoded video frames; and generating a composite display output, wherein the composite display output includes the imagery of the first display output overlaid with the graphical information of the second display output.

16. The non-transitory computer storage medium of claim 15, wherein the first display output depicts imagery at a frame rate of 50 to 240 frames per second.

17. The non-transitory computer storage medium of claim 16, wherein the second display output depicts the graphical information at a frame rate less than or equal to the frame rate of the first display output.

18. The non-transitory computer storage medium of claim 15, further comprising the operations of:

generating a graphical indication around or about the one or more objects indicating the location of the identified objects in the video frame.

19. The non-transitory computer storage medium of claim 15, further comprising the operations of:

determining an external environmental state of the video image capture device; and performing the inference if the external environmental state is suitable to perform inferencing via the machine learning network.

20. The non-transitory computer storage medium of claim 15, wherein the multiple encoded video frames are encoded in a color space format selected from the group consisting of NV12, I420, YV12, YUY2, YUYV, UYVY, UVYU, V308, IYU2, V408, RGB24, RGB32, V410, Y410 and Y42T.

21. The non-transitory computer storage medium of claim 15, wherein the graphical information of the second display output includes graphical indications of the one or more objects disposed over a video display area of the first display output, and textual information corresponding to the one or more objects disposed over a non-video display area of the first display output.

* * * * *